United States Patent
Chu et al.

(10) Patent No.: US 9,924,024 B2
(45) Date of Patent: Mar. 20, 2018

(54) ELECTRONIC DEVICE AND METHOD OF EXECUTING APPLICATION

(71) Applicant: Samsung Electronics Co., Ltd., Suwon-si, Gyeonggi-do (KR)

(72) Inventors: Seyoup Chu, Daegu (KR); Soonok Kim, Seoul (KR); Jinhee Ahn, Suwon-si (KR); Bonghee Lee, Gumi-si (KR); Kyunglim Choi, Incheon (KR); Euiyong Hong, Seoul (KR); Jinwan An, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/311,722

(22) PCT Filed: May 28, 2015

(86) PCT No.: PCT/KR2015/005386
§ 371 (c)(1),
(2) Date: Nov. 16, 2016

(87) PCT Pub. No.: WO2015/183028
PCT Pub. Date: Dec. 3, 2015

(65) Prior Publication Data
US 2017/0094044 A1    Mar. 30, 2017

(30) Foreign Application Priority Data

May 31, 2014  (KR) .................. 10-2014-0066596

(51) Int. Cl.
*H04M 1/725* (2006.01)
*G06F 3/0488* (2013.01)
(Continued)

(52) U.S. Cl.
CPC ...... *H04M 1/72555* (2013.01); *G06F 3/0488* (2013.01); *G06F 3/04845* (2013.01);
(Continued)

(58) Field of Classification Search
CPC combination set(s) only.
See application file for complete search history.

(56) References Cited

U.S. PATENT DOCUMENTS 8,248,449 B2    8/2012   Han
9,241,073 B1 *  1/2016   van Rensburg ....... H04M 3/382
(Continued)

FOREIGN PATENT DOCUMENTS

EP    2 151 978 A1    2/2010
EP      2704377 A2    3/2014
(Continued)

*Primary Examiner* — Cindy Trandai
(74) *Attorney, Agent, or Firm* — Jefferson IP Law, LLP

(57) ABSTRACT

The electronic device includes a display configured to display at least one of a call screen, a screen of an application, or a transmission application screen, an input unit configured to detect a touch input, a controller configured to execute the application during a call, to detect a touch input for moving an object to be transmitted within the screen of the application, to the call screen, to execute a transmission application based on information on the moved object when the touch input is detected, to generate a transmission message, to which the moved object is attached, through the transmission application based on information on a call counterpart, and a communication unit configured to transmit the transmission message to the call counterpart.

18 Claims, 6 Drawing Sheets

(51) Int. Cl.
*G06F 3/0484* (2013.01)
*G06F 3/0482* (2013.01)

(52) U.S. Cl.
CPC ... *H04M 1/72552* (2013.01); *H04M 1/72583* (2013.01); *G06F 3/0482* (2013.01); *H04M 2250/22* (2013.01)

(56) References Cited

U.S. PATENT DOCUMENTS

| | | | |
|---|---|---|---|
| 2005/0164688 A1* | 7/2005 | Satake | H04M 1/6041 455/418 |
| 2008/0146256 A1 | 6/2008 | Hawkins et al. | |
| 2008/0168379 A1* | 7/2008 | Forstall | G06F 3/04883 715/778 |
| 2008/0215998 A1* | 9/2008 | Moore | G06F 9/4443 715/762 |
| 2008/0222688 A1 | 9/2008 | Han | |
| 2010/0037167 A1 | 2/2010 | Son et al. | |
| 2010/0041442 A1* | 2/2010 | Hong | G06F 3/04817 455/566 |
| 2010/0045619 A1* | 2/2010 | Birnbaum | G06F 1/1613 345/173 |
| 2011/0010672 A1* | 1/2011 | Hope | G06F 3/04817 715/841 |
| 2011/0105095 A1* | 5/2011 | Kedefors | H04M 1/72522 455/418 |
| 2011/0161807 A1* | 6/2011 | Choi | G06F 3/0486 715/255 |
| 2011/0252320 A1* | 10/2011 | Arrasvuori | G06F 1/1626 715/704 |
| 2013/0136076 A1 | 5/2013 | McNamara et al. | |
| 2013/0219284 A1* | 8/2013 | Kim | G06F 17/30165 715/739 |
| 2013/0293663 A1* | 11/2013 | Chang | H04N 7/147 348/14.02 |
| 2014/0055552 A1 | 2/2014 | Song et al. | |
| 2014/0365912 A1* | 12/2014 | Shaw | G06F 3/04817 715/748 |
| 2015/0222849 A1 | 8/2015 | Kang et al. | |

FOREIGN PATENT DOCUMENTS

| | | |
|---|---|---|
| KR | 10-2006-0120784 A | 11/2006 |
| KR | 10-2007-0077286 A | 7/2007 |
| KR | 10-2010-0020333 A | 2/2010 |
| WO | 2014-035171 A1 | 3/2014 |

* cited by examiner

[Fig. 1]
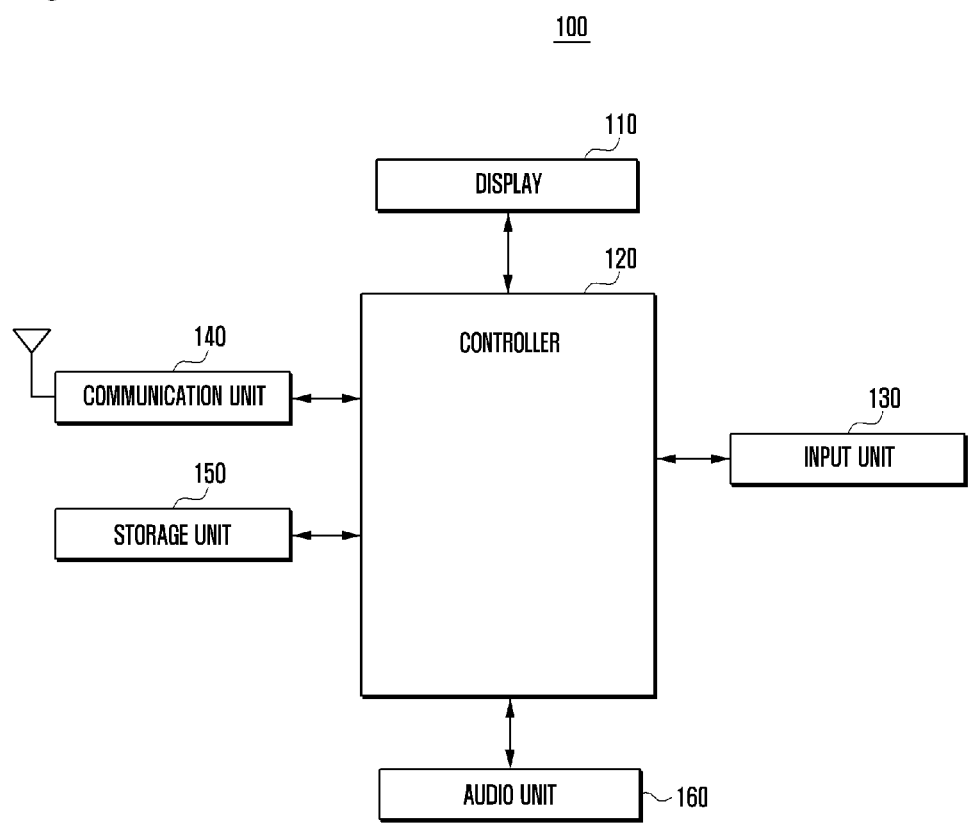

[Fig. 2]
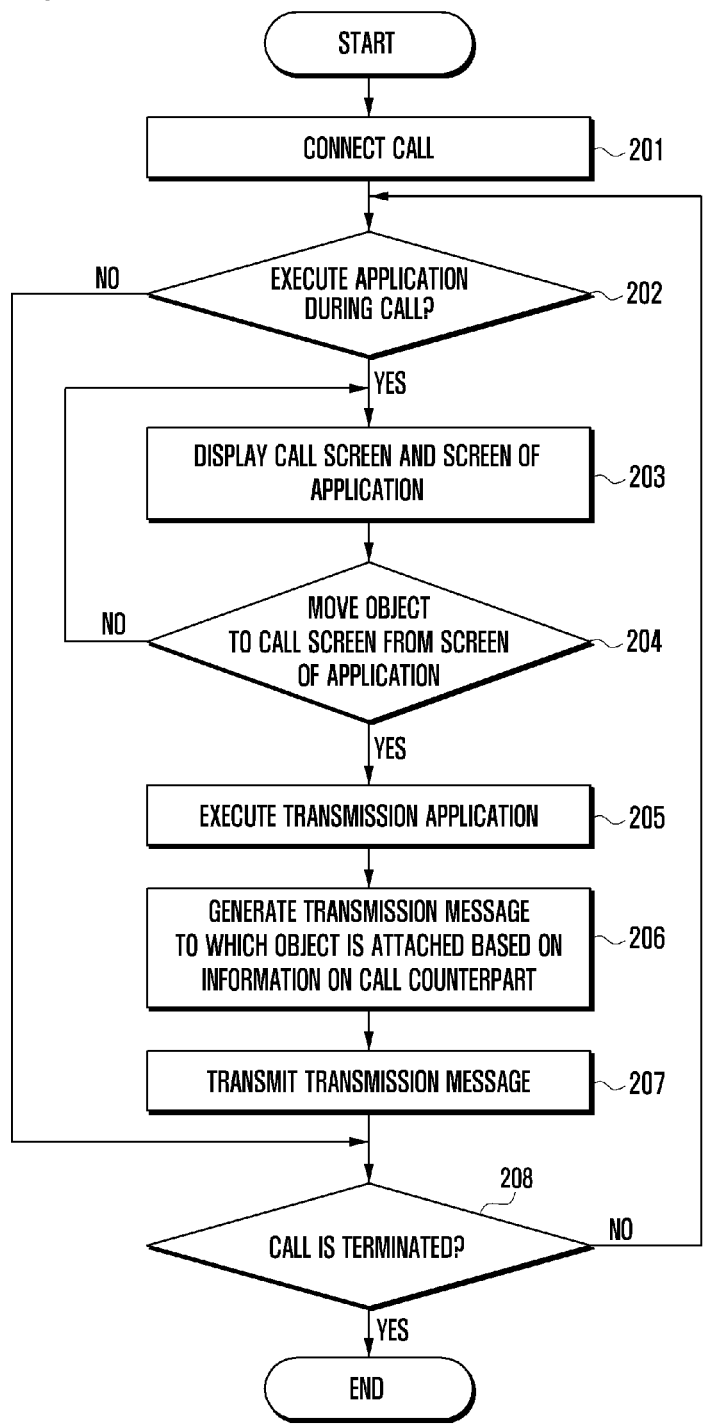

[Fig. 3a]
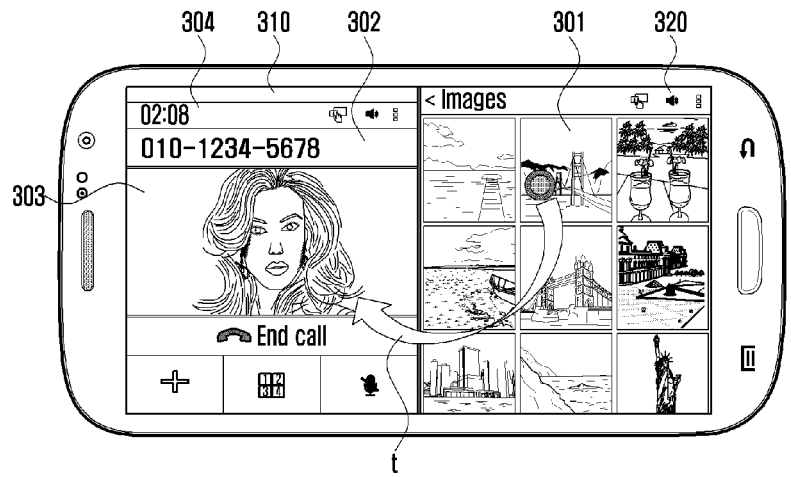
[Fig. 3b]
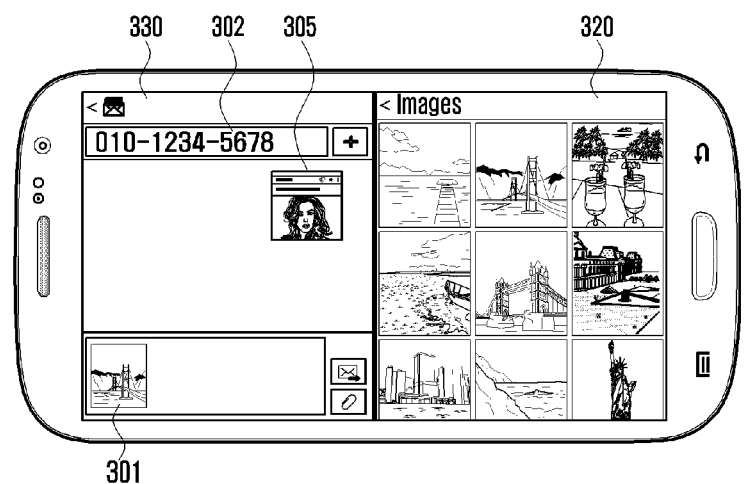
[Fig. 4a]
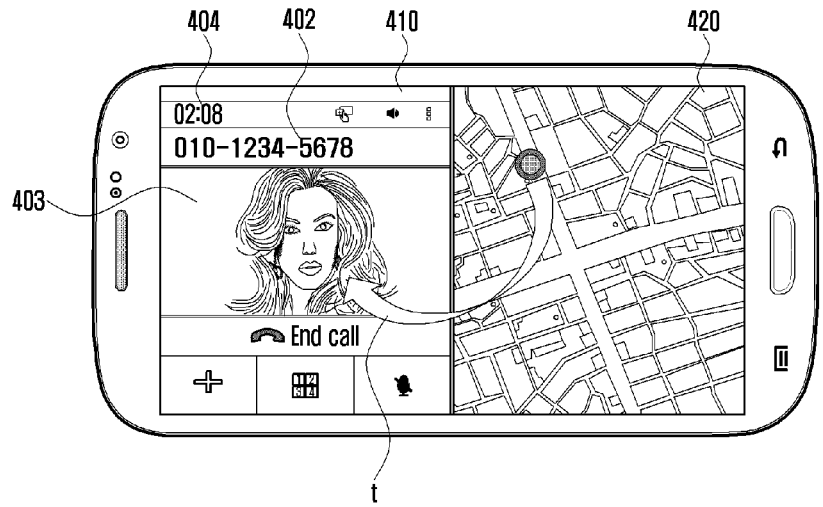

[Fig. 4b]
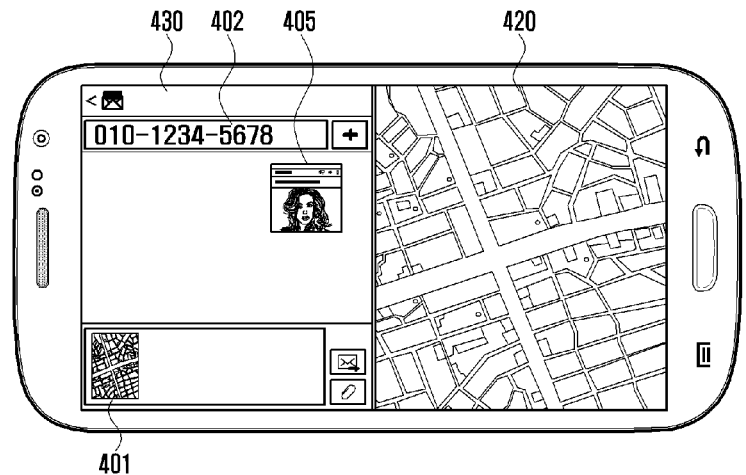
[Fig. 5a]
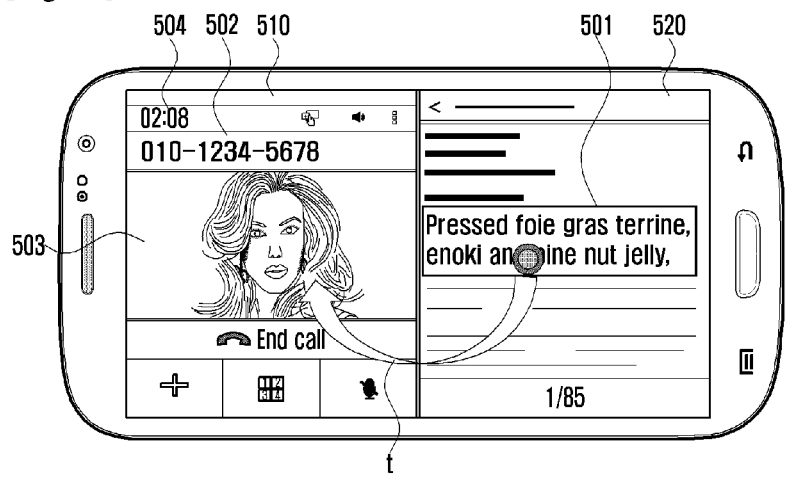
[Fig. 5b]
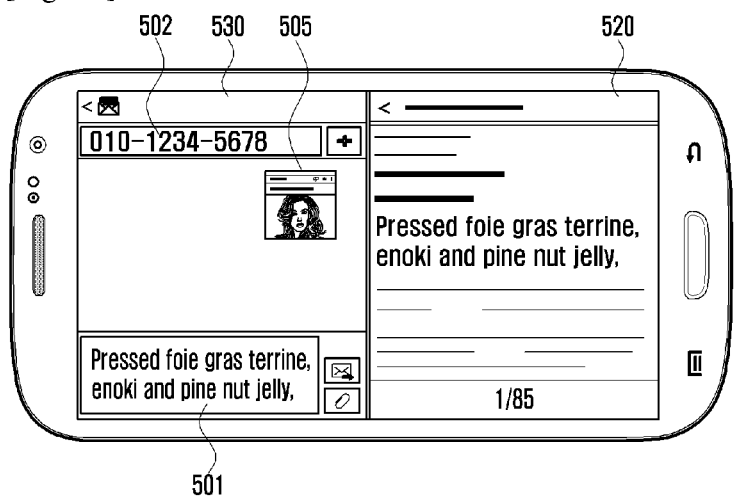

[Fig. 6a]
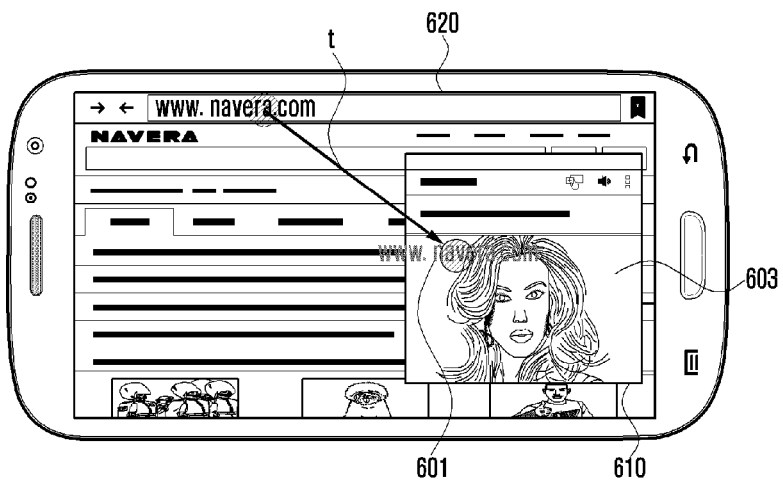
[Fig. 6b]
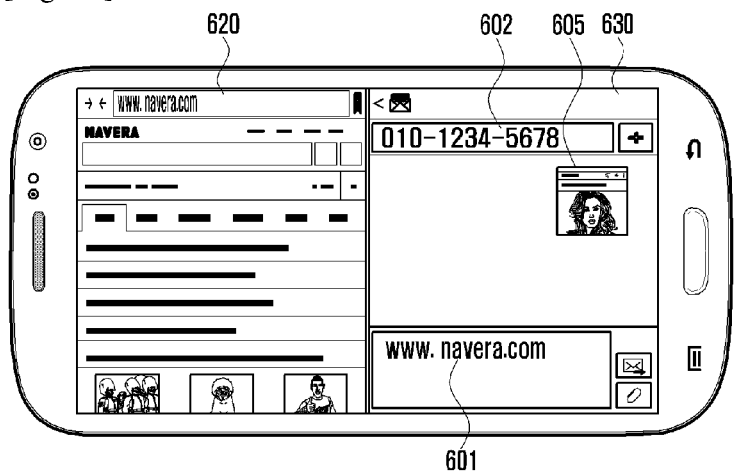
[Fig. 7a]
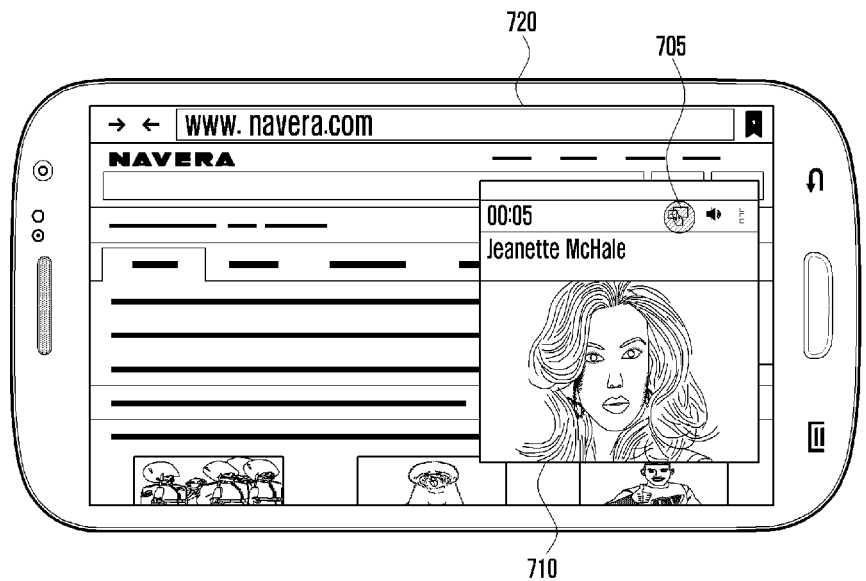

[Fig. 7b]
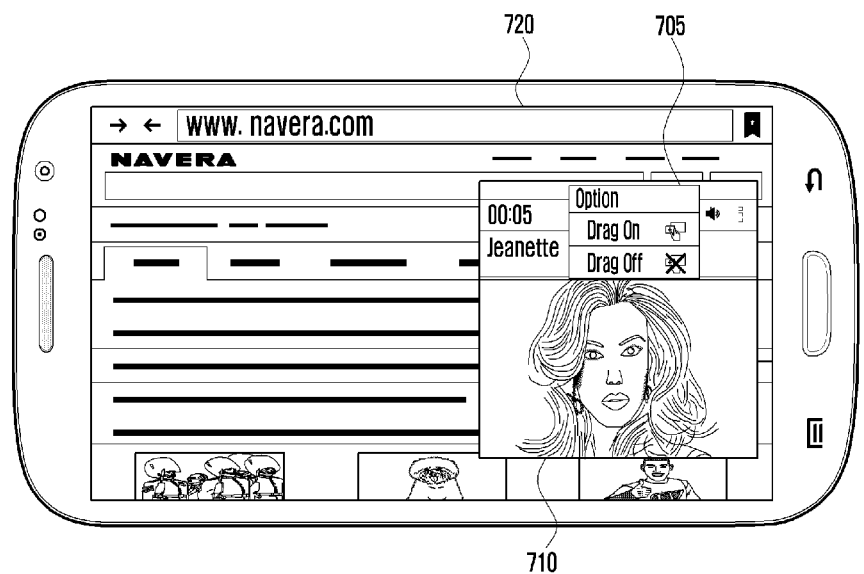

ELECTRONIC DEVICE AND METHOD OF EXECUTING APPLICATION

TECHNICAL FIELD

The present disclosure relates to a method and an electronic device for executing an application during a phone call.

BACKGROUND ART

Portable mobile communication terminals provide various contents as well as voice call services. Electronic devices such as portable mobile communication terminals may transmit contents stored in the electronic devices to counterparts in the form of messages or email. Portable mobile communication terminals may support various applications for sending voice calls, message, or email.

The above information is presented as background information only to assist with an understanding of the present disclosure. No determination has been made, and no assertion is made, as to whether any of the above might be applicable as prior art with regard to the present disclosure.

DISCLOSURE OF INVENTION

Technical Problem

Aspects of the present disclosure are to address at least the above-mentioned problems and/or disadvantages and to provide at least the advantages described below. Accordingly, an aspect of the present disclosure is to provide a method and an electronic device for executing an application during a phone call.

In order to transmit contents through an electronic device during a call, stopping the call for a while is required. After stopping the call, a user may execute a transmission application, input a phone number of counterpart, select the contents to be transmitted, attach the transmission application to the contents, and then transmit the contents to the call counterpart. Accordingly, when the user desires to transmit contents to the call counterpart through the electronic device, the user should perform several tasks, which inconveniences the user.

Another aspect of the present disclosure is to provide a method of automatically executing a particular application by an electronic device in response to a touch input by a user.

Another aspect of the present disclosure is to provide an electronic device and an application execution method which generate a message to which an object to be transmitted selected from a screen of an application is attached and transmit the generated message to a counterpart during a call with that counterpart.

Solution to Problem

In accordance with an aspect of the present disclosure, a method of executing an application by an electronic device is provided. The method includes executing an application during a call, when the application is executed, displaying a call screen and a screen of the application, detecting a touch input for moving, to the call screen, an object to be transmitted within the screen of the application, when the touch input is detected, executing a transmission application based on information on the moved object, generating a transmission message, to which the moved object is attached, through the transmission application based on information on a call counterpart, and transmitting the transmission message to the call counterpart.

In accordance with another aspect of the present disclosure, an electronic device is provided. The electronic device includes a display configured to display at least one of a call screen, a screen of an application, or a transmission application screen, an input unit configured to detect a touch input, a controller configured to execute the application during a call, to detect a touch input for moving an object to be transmitted within the screen of the application, to the call screen, to execute a transmission application based on information on the moved object when the touch input is detected, to generate a transmission message, to which the moved object is attached, through the transmission application based on information on a call counterpart, and a communication unit configured to transmit the transmission message to the call counterpart.

Advantageous Effects of Invention

An electronic device and an application execution method according to various embodiments of the present disclosure can execute a preset particular application in response to a touch input by a user during a call.

An electronic device and an application execution method according to various embodiments of the present disclosure can automatically generate a transmission message to which a particular object to be transmitted selected from a screen of an application is attached during a call.

An electronic device and an application execution method according to various embodiments of the present disclosure can conveniently generate and transmit a message including particular contents to a call counterpart during a call with that counterpart.

An electronic device and an application execution method according to various embodiments of the present disclosure can improve user convenience by simplifying tasks for generating a message to be transmitted to a call counterpart.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description in conjunction with the accompanying drawings, in which:

FIG. 1 is a block diagram of an electronic device according to various embodiments of the present disclosure;

FIG. 2 is a flowchart illustrating an application execution method by an electronic device according to an embodiment of the present disclosure;

FIGS. 3a, 3b, 4a, 4b, 5a, 5b, 6a, and 6b illustrate a message writing operation in an electronic device and an application execution method according to various embodiments of the present disclosure; and FIGS. 7a and 7b illustrate an operation for configuring whether to support movement of an object in an electronic device and an application execution method according to various embodiments of the present disclosure.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, t those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some components may be exaggerated, omitted, or schematically illustrated, and a size of each component may not precisely reflect the actual size thereof. Thus, the present disclosure is not limited by the relative size or space drawn in the accompanying drawings.

Further, the singular form used in the present disclosure is intended to include the plural form unless clearly indicated in the context. Further, the term "and" used in the present specification should be understood as including any and all combinations of one or more of the associated listed items.

Further, the term "unit", "module", etc. used in the present disclosure implies a unit for performing at least one function or operation, which can be implemented by hardware, software, or a combination of hardware and software.

Hereinafter, the present disclosure will be described with reference to the accompanying drawings.

FIG. 1 is a block diagram of an electronic device according to various embodiments of the present disclosure.

Referring to FIG. 1, the electronic device 100 may include a display 110, a controller 120, an input unit 130, a communication unit 140, a storage unit 150, and an audio unit 160.

The display 110 may perform a function of displaying an image or data for a user. The display 110 may include a display panel. The display panel may employ, for example, a Liquid Crystal Display (LCD) or an Active Matrix Organic Light Emitting Diode (AM-OLED). The display 110 may further include a controller that controls the display panel. The display panel may be implemented to be, for example, flexible, transparent, or wearable.

The display 110 may be combined with a touch panel and provided in the form of touch screen. For example, the touch screen may be implemented by an integral module generated by coupling a display panel and a touch panel in a stack structure.

The touch panel may recognize a user's touch input based on at least one of, for example, a capacitive type, a resistive type, an infrared type, and an acoustic wave type. The touch panel may further include a controller (not illustrated). Meanwhile, the capacitive type touch panel may recognize proximity as well as a direct touch. The touch panel may further include a tactile layer. In this case, the touch panel may provide a user with a tactile reaction.

When the display 110 has the form of touch screen, the display 110 may perform a function of the input unit 130. The display 110 may be configured integrally with the input unit 130.

According to various embodiments of the present disclosure, the display 110 may display a call screen, a screen of an application, or a transmission application screen. The call screen may be a screen displayed during a call while a call application is executed. The call screen may include a call counterpart's name, information on a call counterpart stored in the electronic device 200, call time, date, or call receiving sensitivity. When call counterpart's pictures are pre-stored in the electronic device 100 stores, the call screen may include the call counterpart's pictures. The call screen may include a call end icon, a phone book addition icon, a keypad activation icon, and a mute icon. The screen of the application may be a screen according to the execution of at least one of a picture application, a map application, an Internet application, and a text application (for example, an electronic book application). For example, when the application is a picture application, the screen of the application may include a list of pictures stored in the electronic device 100. The display 10 may display the transmission application screen. For example, transmission applications may include a message application for text message, Short Message Service (SMS), or Multimedia Messaging Service (MMS) or an email application for email.

The display 110 may simultaneously display the call screen and the screen of the application. The display 110 may simultaneously display the call screen, the screen of the application, and the transmission application screen. The display 110 may display the call screen, the screen of the application, and the transmission application screen together. The display 110 may change the sizes of the call screen, the screen of the application, and the transmission application screen. For example, the display 110 may display the call screen, the screen of the application, and the transmission application screen, with the same or different sizes according to a setting. Further, the display 110 may change the sizes of the call screen, the screen of the application, and the transmission application screen. The display 110 may display at least one of the call screen, the screen of the application, and the transmission application screen in the form of pop-up window.

The controller 120 may control a plurality of hardware and software components connected to the controller 120 by driving an operating system and an application program, and may process various pieces of data including multimedia data and calculations. The controller 120 may be implemented by, for example, a System on Chip (SoC) and may further include a Graphic Processing Unit (GPU).

According to various embodiments of the present, the controller 120 may execute an application during a call. The controller 120 may detect a user input for selecting the application. The controller 120 may execute the selected application. After executing the application, the controller 120 may control the display 110 to display the call screen and the screen of the application together. The controller 120 may control the display 110 to display the call screen or the screen of the application in the form of pop-up window.

The controller 120 may detect a touch input for moving an object within the screen of the application to the call screen.

The touch input may include at least one of a flick, and a drag and drop input. For example, the touch input may be an input for dragging and dropping, to the call screen, a particular object displayed in the screen of the application. When the touch input is detected, the controller 120 may execute the transmission application based on information on the moved object. The information on the object may be attribute information of the object or capacity information of the object. The attribute information may be information indicating the type of object. For example, the object may include text data, image data, audio data, multimedia data, or map data. The attribute information may be information for indicating the type of object. The attribute information may include information on a program or application linked to display or execute the object according to the type of corresponding application. The capacity information may be information on a total data size (or capacity) of one or more objects moved to the call screen. The controller 120 may select the transmission application to be executed based on the attribute information of the object. For example, when capacity of the object is large, the object may exceed maximum capacity to be transmitted in the form of message. When the capacity of the object is equal to or less than a preset value, the controller 120 may execute a message application. When the capacity of the object is larger than the preset value, the controller 120 may execute an email application.

The controller 120 may generate a transmission message to which the selected object is attached, by using the transmission application based on information on a call counterpart.

According to various embodiments of the present disclosure, the controller 120 may detect a drag input to the call screen from the screen of the application. When the drag input is detected, the controller 120 may capture the screen of the application. The controller 120 may configure the captured screen as the object to be attached to the transmission message. For example, when a call screen and a map application screen 420 are displayed on the display 110, the controller 120 may detect a drag input to the call screen from the map application screen 420. The controller 120 may capture a map displayed on the map application screen 420. The controller 120 may configure the captured map as the object to be attached to the transmission message. The controller 120 may attach the captured map (object) when generating the transmission message.

According to various embodiments of the present disclosure, the controller 120 may select text displayed on the screen of the application, as the object to be attached to the transmission message. The controller 120 may select some of the text displayed on the screen of the application, as the object to be attached to the transmission message according to a user input. For example, the controller 120 may select some text from text displayed on a text application (for example, an electronic book application, web browser application, or document viewer application) screen and configure the selected text as the object to be attached to the transmission message. The controller 120 may detect a touch input for moving the selected text (object) to the call screen. The controller 120 may generate the transmission message to which the selected text is attached.

According to various embodiments of the present disclosure, the controller 120 may select one or more objects from the objects displayed on the screen of the application, as the objects to be transmitted to the transmission message. For example, when one or more pictures (for example, thumbnail images of pictures pre-stored in the electronic device 100) are included in a picture application screen, the controller 120 may select one or more pictures from the pictures included in the picture application screen. The controller 120 may select one or more pictures based on a user input for selecting pictures. The controller 120 may detect a touch input for moving the one or more selected objects to the call screen. According to an embodiment, when a plurality of objects is selected, the touch input may be an input for simultaneously moving the plurality of objects to the call screen.

According to various embodiments of the present disclosure, when the touch input for moving the objects to the call screen is detected, the controller 120 may control the display 110 to switch the call screen to a transmission application screen. When the touch input for moving the objects to the call screen is detected, the controller 120 may also control the display 110 to simultaneously display the call screen, the application screen to be transmission, and the transmission application screen.

According to various embodiments of the present disclosure, the controller 120 may determine whether a preset user input is received during a call. The preset user input may be, for example, a long press input. When the preset user input is detected, the controller 120 may control the display 110 to display, during the call, an option window for configuring whether to support movement of the objects to the call screen from the screen of the application. For example, the application may be an application which does not support the touch input (for example, a drag and drop input) for moving the objects. When the preset user input (for example, the long press input) is received during the call, the controller 120 may display the option window for configuring support of the touch input for moving the object in the application displayed on the display 110. The option window may be displayed in the form of separate pup-up window or displayed in the form of particular icon in some areas of the call screen or the screen of the application which is displayed on the display 110. When the configuration input is received from the user through the optional window, the controller 120 may change a setting (or mode) of the electronic device 100 to support the touch input for moving the object regardless of the type of application which is being executed.

The input unit 130 may receive various commands from the user. The user input unit 130 may include, for example, at least one of a pen sensor and a key. The pen sensor may be implemented using a separate pen recognition sheet through, for example, a scheme equal to the scheme of receiving a user's touch input. The key 123 may include, for example, a mechanical key or a touch key. The mechanical key may include at least one of, for example, a power button disposed on one side of the electronic device 100 to turn on the display 110 of the electronic device 100 when pushed, one or more volume buttons disposed on the other side of the electronic device 100 to control volume when pushed, and a home button disposed on a lower center of the display 110 of the electronic device 100 to move a screen to a home screen when pushed. The touch key may include at least one of, for example, a menu key which is disposed on one lower side of the display 110 of the electronic device 100 to provide a menu related to a content currently displayed when touched and a return key disposed on the other lower side of the display 110 of the electronic device 100 to provide a function of retuning to a previous screen of the screen currently displayed when touched.

The input unit 130 may include a plurality of input keys and function keys for receiving number or character information and configuring various functions. The function keys may include a direction key, a side key, and a shortcut key, which are configured to execute particular functions. The input unit 130 may generate a key signal related to a user setting and a control of the function of the electronic device 100 and transmit the generated key signal to the controller 120. The input unit 130 may include a touch panel. The touch panel may receive a touch input from the user. The touch panel may transmit the received touch input to the controller 120. According to an embodiment, the touch panel may be formed integrally with the display 110. The input unit 130 may detect a touch input (for example, a drag and drop input, a long press input, and a tap input). The input unit 130 may transmit the detected touch input to the controller 120.

The communication unit 140 may support a wireless communication unit and may be configured as a mobile communication module when the electronic device 100 supports the mobile communication function. To this end, the communication unit 140 may include a Radio Frequency (RF) transmitter for up-converting and amplifying a frequency of a transmitted radio signal and an RF receiver for low noise-amplifying a received radio signal and down-converting a frequency. Further, when the electronic device 100 supports a wireless short-range communication function, such as wireless fidelity (Wi-Fi) communication, Bluetooth (BT) communication, Zigbee communication, Ultra WideBand (UWB) communication, and Near Field Communication (NFC), the communication unit 140 may include a WiFi communication module, a Bluetooth communication module, a Zigbee communication module, a UWB communication module, and an NFC communication module. Particularly, the communication unit 140 according to an embodiment of the present disclosure may transmit a transmission message having an object attached thereto to a call counterpart under a control of the controller 120.

The storage unit 150 may include at least one of an internal memory and an external memory. The internal memory may include, for example, at least one of a volatile memory (for example, a Dynamic Random Access Memory (DRAM), a Synchronous Dynamic RAM (SDRAM), etc.), a non-volatile memory (e.g. an One Time Programmable Read-Only Memory (OTPROM), a Programmable ROM (PROM), an Erasable and Programmable ROM (EPROM), an Electrically Erasable and Programmable ROM (EEPROM), a Mask ROM, a Flash ROM, etc.), a Hard Disk Drive (HDD), or a Solid State Drive (SSD). According to an embodiment of the present disclosure, the controller 120 may load a command or data received from at least one of the non-volatile memory and other components in the volatile memory and process the loaded command or data. Further, the controller 120 may store the data received from or generated by other components in the non-volatile memory.

The external memory may include at least one of, for example, a Compact Flash (CF), a Secure Digital (SD), a Micro SD (Micro-SD), a Mini SD (Mini-SD), an extreme Digital (xD) and a memory stick.

The storage unit 150 may store an operating system for controlling resources of the electronic device 100, and an application program for an operation of an application. The operating system may include a kernel, middleware, an Application Program Interface (API), and the like. For example, the operating system may be Android, iOS, Windows, Symbian, Tizen, or Bada.

The audio unit 160 may output various pieces of audio data configured during the operation of the electronic device 100, audio data according to the reproduction of audio files stored in the storage unit 150, and audio data received from the outside. The audio unit 160 may support a function of collecting audio data. The audio unit 160 may include a speaker, a receiver, earphones, or a microphone.

According to various embodiments of the present disclosure, when a call connection is made, the audio unit 160 may receive voice data to be transmitted to a call counterpart through the microphone or output voice data received from the counterpart.

FIG. 2 is a flowchart illustrating an application execution method by the electronic device 100 according to an embodiment of the present disclosure.

Referring to FIG. 2, in operation 201, the electronic device 100 may connect a call. The electronic device 100 may execute a call application. The electronic device 100 may make a call connection through the call application or receive a call from a counterpart. In operation 201, the electronic device 100 may display a call screen. The call screen may include a call counterpart's phone number, pictures of the counterpart pre-stored in the electronic device 100, call time, and icons or keys for performing one or more call functions (for example, functions for making a call connection, mute, or call termination).

In operation 202, the electronic device 100 may execute an application. The application may be at least one of a picture application, a map application, an Internet application, a multimedia application (for example, an application for reproducing a video or sound source) and a text application. The application may be any one of applications stored in the electronic device 100. In operation 202, the electronic device 100 may receive an input for executing the application, from the user. For example, the electronic device 100 may receive a touch input for selecting a particular application. The electronic device 100 may execute an application corresponding to the input from the user. When the application is executed, the electronic device 100 may perform operation 203. When the application is not executed, the electronic device 100 may determine whether the call ends in operation 208.

In operation 203, the electronic device 100 may display the call screen and a screen of the application. The electronic device 100 may simultaneously display the call screen and the screen of the application in a predetermined ratio. The electronic device 100 may display the call screen and the screen of the application in the form of pop-up window. For example, the electronic device 100 may display the screen of the application, and display the call screen in the form of pop-up window which overlaps some areas of the screen of the application.

In operation 204, the electronic device 100 may detect a touch input for moving an object within the screen of the application to the call screen. The screen of the application may include one or more objects. The object may be at least one of a picture, text, map, icon, sound source, video, multimedia file, and drawing which are included in the screen of the application. For example, when the application is an Internet application, an Internet address, text, drawing, or video included in a screen of the Internet application may be one object. When the application is a map application, a map (for example, an image which stores a part of the map) displayed on the screen of the application may be the object.

According to various embodiments of the present disclosure, the electronic device 100 may detect a drag input to the call screen from the screen of the application in operation 204. When the drag input is detected, the electronic device 100 may capture at least some of the screen of the application. The electronic device 100 may configure the captured screen of the application as an object to be attached to a transmission message. For example, the application may be the map application. The electronic device 100 may change a map area displayed on the screen of the application. When the drag input is detected, the electronic device 100 may capture all or some of the map displayed on the screen of the application. The electronic device 100 may configure the captured map as the object to be attached to the transmission message.

According to various embodiments of the present disclosure, the electronic device 100 may configure at least some of the text displayed on the screen of the application as the object to be attached to the transmission message in operation 204. For example, when the application is an electronic book application, the screen of the application may include text. The electronic device 100 may select all or at least some of the text within the screen of the application, according to a user input. The electronic device 100 may configure the selected text as the object to be attached to the transmission message. The electronic device 100 may detect a touch input for moving the selected text to the call screen.

According to various embodiments of the present disclosure, the electronic device 100 may select one or more objects within the screen of the application in operation 204. The electronic device 100 may receive the touch input for simultaneously moving the one or more selected objects to the call screen.

According to various embodiments of the present disclosure, the electronic device 100 may receive a preset user input during the call in operation 204. The preset user input may be, for example, a long press input. When the preset user input is received, the electronic device 100 may display, during the call, an option window for configuring whether to support the touch input for moving the object to the call screen from the screen of the application. The electronic device 100 may limit, during the call, the touch input (for example, a drag and drop input) for moving the object to the call screen from the screen of the application. The electronic device 100 may configure whether to allow the touch input during the call in response to the user input through the option window.

When the touch input for moving the object is detected, the electronic device 100 may perform operation 205. When the touch input for moving the object is not detected, the electronic device 100 may perform operation 203 again.

In operation 205, the electronic device 100 may execute a transmission application based on information on the moved object. The information on the object may include attribute information of the object (for example, information indicating the type or kind of object to identify whether the object is a picture, text, or video) or capacity information of the object. According to various embodiments of the present disclosure, the electronic device 100 may execute one of a message application and an email application according to capacity information of the moved object according to the touch input. According to various embodiments of the present disclosure, the electronic device may execute a file sharing application (for example, an application for transmitting a file to an external device by using a short-range network or infrared ray) according to the information of the object. The capacity information of the object may be total capacity of one or more objects moved according to the touch input. When the capacity of the moved object is equal to or less than a preset value, the electronic device 100 may execute a message application. When the capacity of the moved object is larger than the preset value, the electronic device 100 may execute an email application. Alternatively, the electronic device may execute the file sharing application considering the capacity of the object and a distance from a counterpart.

In operation 205, the electronic device 100 may switch the call screen to the screen of the application. The electronic device 100 may simultaneously display the screen of the application and a transmission application screen. The electronic device 100 may simultaneously display the call screen, the screen of the application, and the transmission application screen. The electronic device 100 may display at least one of the call screen, the screen of application, and the transmission application screen in the form of pop-up window.

In operation 206, the electronic device 100 may generate a transmission message to which the object moved to the call screen is attached, by using the transmission application based on information on a call counterpart. The transmission message may be one of a text message, an SMS message, an MMS message, and email. For example, when the transmission application executed by the electronic device 100 is the message application, the transmission message may be a text message, an SMS message, an instant message of a messenger, or an MMS message. When the transmission application executed by the electronic device 100 is the email application, the transmission message may be email. The information on the call counterpart may include a phone number or email address of the counterpart. The electronic device 100 may search for or extract information on a call counterpart (for example, a phone number, social network service (SNS) identifier (ID), message ID, or name registered in a messenger or SNS) from data of a pre-stored phone book, a messenger, or an SNS. The electronic device 100 may receive information on the call counterpart from an external network during the call connection. For example, based on the information on the call counterpart (for example, a phone number of the call counterpart), the electronic device 100 may automatically configure the phone number of the call counterpart as a receiver of the text message and generate the transmission message. Based on the information on the call counterpart (for example, an email address), the electronic device 100 may automatically configure the email address of the call counterpart as a receiver of the email and generate the email. The electronic device 100 may execute a messenger or SNS application to generate an Instant message based on a message ID or SNS ID of the call counterpart. The electronic device 100 may execute a file sharing application to search for an external electronic device of the call counterpart based on a device ID of the call counterpart and attempt a connection. The electronic device 100 may attach the object, which has moved to the call screen from the application, to the transmission message (for example, text message or email). The electronic device 100 may display a transmission message writing screen on the screen of the application.

In operation 207, the electronic device 100 may transmit the generated transmission message to the call counterpart. The electronic device 100 may transmit a text message, SMS message, MMS message, or instant message of a messenger to the call counterpart through the communication unit 140. The electronic device 100 may transmit email to the call counterpart through a short-range communication unit or an external network.

In operation 208, the electronic device 100 may receive a call termination input. The call termination input may be a touch input for a call termination key (or icon) included in the call screen. In operation 208, when the call termination input is received, the electronic device 100 may end the call. When the call termination input is not received, the electronic device 100 may maintain the call. When the call termination input is not received, the electronic device 100 may perform operation 202 again.

A non-transitory computer-readable recording medium according to various embodiments of the present disclosure may include one or more programs including commands for allowing the electronic device 100 to perform a method of executing an application. A method of executing an application may include: executing an application during a call; when the application is executed, displaying a call screen and a screen of the application; detecting a touch input for moving an object within the screen of the application, to the call screen; when the touch input is detected, executing a transmission application based on information on the moved object; generating a transmission message, to which the moved object is attached, through the transmission application based on information on a call counterpart; and transmitting the transmission message to the call counterpart.

FIGS. 3a, 3b, 4a, 4b, 5a, 5b, 6a, and 6b illustrate a message writing operation in the electronic device 100 and an application execution method according to various embodiments of the present disclosure.

FIGS. 3a and 3b illustrate an operation in the electronic device 100 and an application execution method when an application is a picture application according to various embodiments of the present disclosure.

Referring to FIG. 3a, the electronic device 100 may execute the picture application during a call. The electronic device 100 may display a call screen 310 and a picture application screen 320 on the display in a predetermined ratio. The call screen 310 may include a call counterpart's phone number 302, a counterpart's picture 303, and a call time 304. The picture application screen 320 may include a list of pictures stored in the electronic device 100. The electronic device 100 may detect a touch input (t) for moving a particular picture (object) 301 included in the picture application screen 320 to the call screen 310. When the touch input (t) is detected, the electronic device 100 may execute a message application. Referring to FIG. 3b, when the message application is executed, the electronic device 100 may switch the call screen 310 or a picture application screen 320 of an application (for example, the picture application screen 320) to a message application screen 330. The electronic device 100 may switch the call screen 310 to a transmission application screen (for example, the message application screen 330). Further, when the touch input (t) is detected, the electronic device 100 may execute an email application or a file sharing application as well as the message application. The electronic device 100 may display the call screen 310 and the picture application screen 320. The electronic device 100 may display the picture application screen 320 and the message application screen 330. The electronic device 100 may display the call screen 310, the picture application screen 320, and the message application screen 330 together. The message application screen 330 may be a new transmission message writing screen. The electronic device 100 may generate a transmission message to which the picture 301 moved to the call screen 310 is attached. The electronic device 100 may automatically configure a recipient of the new message as a call counterpart based on information on the call counterpart (for example, a phone number of the counterpart). For example, the electronic device 100 may automatically input the phone number 302 of the call counterpart into a receiver list of the message application screen 330. The message application screen 330 may include smaller version 305 of the counterpart's picture 303. Although not illustrated in FIG. 3b, the electronic device 100 may automatically input an email address of the counterpart when the email application is executed. When the file sharing application is executed, the electronic device 100 may automatically search for an identification number or name of a counterpart's device and transmit the object to the counterpart's device. The electronic device 100 may transmit the message to which the picture 301 is attached to the call counterpart.

FIGS. 4a and 4b illustrate an operation in the electronic device 100 and an application execution method when an application is a map application according to various embodiments of the present disclosure.

Referring to FIG. 4a, the electronic device 100 may execute the map application during a call. The electronic device 100 may display a call screen 410 and a map application screen 420 in a predetermined ratio. The call screen 410 may include a call counterpart's phone number 402, a counterpart's picture 403, and a call time 404. The map application screen 420 may include a map of a particular area. The electronic device 100 may enlarge or reduce a map displayed on the map application screen 420 and search for a map of a particular area according to a user input. The electronic device 100 may detect a touch input (t) (for example, a drag and drop input) which is connected from the map application screen 420 to the call screen 410. When the touch input (t) is detected, the electronic device 100 may capture the map displayed on the map application screen 420. The electronic device 100 may store the captured map 401. The electronic device 100 may execute a message application after capturing the map.

Referring to FIG. 4b, when the message application is executed, the electronic device 100 may switch the call screen 410 to the message application screen 430. The electronic device 100 may display the message application screen 430 and the map application screen 420. The message application screen 430 may be a new transmission message writing screen. The electronic device 100 may generate a new transmission message to which the capture map is attached. The electronic device 100 may automatically configure a recipient of the new message as a call counterpart based on information on the call counterpart (for example, the phone number 402 of the counterpart). For example, the electronic device 100 may automatically enter the phone number 402 of the counterpart as a recipient of the message. The message application screen 430 may include smaller version 405 of the counterpart's picture 403. The electronic device 100 may transmit the transmission message to which the captured map 401 is attached to the call counterpart.

FIGS. 5a and 5b illustrate an operation in the electronic device 100 and an application execution method when an application is a text application according to various embodiments of the present disclosure.

Referring to FIG. 5a, the electronic device 100 may execute the text application during a call. The text application may include, for example, an electronic book application, a document reader application, and an application for displaying contents including text. The electronic device 100 may display a call screen 510 and a text application screen 520 on the display in a predetermined ratio. The call screen 510 may include a call counterpart's phone number 502, a counterpart's picture 503, and a call time 504. The text application screen 520 may include the content of a particular document including text. The electronic device 100 may select all or at least some of the text displayed on the text application screen 520 according to a user input. The electronic device 100 may detect a touch input (t) (for example, a drag and drop input) for moving the selected text 501 to the call screen 510 from the text application screen 520. When the touch input (t) is detected, the electronic device 100 may execute a message application. The electronic device 100 may switch the call screen 510 to a message application screen 530. The electronic device 100 may display the message application screen 530 and the text application screen 520. The message application screen 530 may be a new transmission message writing screen. The electronic device 100 may generate a new transmission message to which the selected text 501 is attached. When the text 501 related to a webpage is attached, the electronic device 100 may generate a transmission message to which text and link information are attached. For example, when an address of a particular site is attached to the transmission message, the attached text may include hyperlink information. The electronic device 100 may automatically input the selected text 501 as the content of the transmission message. Alternatively, the electronic device 100 may capture the selected text 501 and attach the captured text image as an attached file. The electronic device 100 may automatically configure a recipient of the new transmission message as a call counterpart based on information on the call counterpart (for example, the phone number 502 of the counterpart). For example, the electronic device 100 may automatically enter the phone number 502 of the counterpart as a recipient of the message. The message application screen 530 may include smaller version 505 of the counterpart's picture 503. The electronic device 100 may transmit the message to which the selected text 501 is attached to the call counterpart.

FIGS. 6*a* and 6*b* illustrate an operation in the electronic device 100 and an application execution method when an application is an Internet application according to various embodiments of the present.

Referring to FIG. 6*a*, the electronic device 100 may execute the Internet application during a call. The Internet application may include, for example, an application for executing various browsers. The electronic device 100 may display a call screen 610 and an Internet application screen 620 in a predetermined ratio. The electronic device 100 may display at least one of the call screen 610 and a screen of an application (for example, the Internet application screen 620) in the form of pop-up window. The call screen 610 may include the picture 603 of the call counterpart. The Internet application screen 620 may include a particular site screen, a site address 601, and a site name. The electronic device 100 may select an object (for example, an address 601 of the currently displayed site) displayed on the Internet application screen 620 according to a user input. The electronic device 100 may detect a touch input (t) (for example, a drag and drop input) for moving one or more objects to the call screen 610 from the Internet application screen 620. When the touch input (t) is detected, the electronic device 100 may copy and temporarily store the corresponding object. For example, when the touch input (t) for moving the site address 601 to the call screen 610 from the Internet application screen 620 is detected, the electronic device 100 may copy and temporarily store the Internet address 601 displayed on an Internet address bar. When the touch input (t) is detected, the electronic device 100 may execute a message application.

Referring to FIG. 6*b*, when the message application is executed, the electronic device 100 may switch the call screen 610 to the message application screen 630. The electronic device 100 may display the message application screen 630 and the Internet application screen 620. The message application screen 630 may be a new transmission message writing screen. The electronic device 100 may generate a transmission message to which the Internet address (object) moved to the call screen 610 is attached. According to various embodiments of the present disclosure, when the touch input (t) is detected, the electronic device 100 may generate a transmission message to which an image captured from a webpage displayed on the Internet application screen 620 is attached. The electronic device 100 may automatically input the Internet address 601 moved to the call screen 610 as the content of the new message. The electronic device 100 may automatically configure a recipient of the transmission message as a call counterpart based on information on the call counterpart (for example, a phone number 602 of the counterpart). For example, the electronic device 100 may automatically enter the phone number 602 of the counterpart as a recipient of the message. The message application screen 630 may include smaller version 605 of the counterpart's picture 603. The electronic device 100 may transmit the transmission message to which the selected text is attached to the call counterpart.

According to the electronic device 100 and the application execution method according to various embodiments of the present disclosure, the electronic device 100 automatically generates a message to which an object corresponding to a touch input (t) is attached based on information on a call counterpart, thereby reducing unnecessary tasks by the user and increasing user convenience.

FIGS. 7*a* and 7*b* illustrate an operation for configuring whether to support movement of an object in the electronic device 100 and the application execution method according to various embodiments of the present disclosure.

Referring to FIGS. 7*a* and 7*b*, it is assumed that an application is an Internet application. However, the operation for configuring whether to support movement of the object in the electronic device 100 and the application execution method according to various embodiments of the present disclosure is not limited to the case where the application is the Internet application.

Some of the applications included in the electronic device 100 may not support a particular touch input (for example, a drag and drop input). For example, in the Internet application, an address of a current site displayed in an address bar, a particular icon, text displayed on a site, or pictures may not be moved through a drag input. According to various embodiments of the present disclosure, in order to execute a transmission application during a call, a touch input for moving an object to a call screen 710 from an Internet application screen 720 of an application may be required. Accordingly, the electronic device 100 may change a setting so that the touch input can be made even in an application which does not support the touch input for moving a particular object during a call. The electronic device 100 may receive a specific user input (for example, a long press input) during a call. When a long press input is received, the electronic device 100 may display an option window for configuring whether to support a touch input for moving an object within the Internet application screen 720 of the application (for example, an Internet application). The electronic device 100 may display an option window 705 in the form of icon in some areas of the call screen 710 or the Internet application screen 720 of the application. That is, the option window 705 may be an icon or a virtual key displayed in a particular area within the displayed existing screen. In this case, the electronic device 100 may change a setting according to a touch input (for example, a tap input) made on the option window 705.

Referring to FIG. 7b, the electronic device 100 may display the option window 705 as a separate pop-up window to receive a user's setting. The pop-up window is not limited to the form illustrated in FIG. 7b and may have various forms in which a user's setting can be made.

In a case where the electronic device 100 is configured to allow a touch input for moving an object during a call, when the electronic device 100 receives the touch input on a screen of an application (for example, the Internet application screen 720) which does not support the touch input, a text or image within the screen may be forcibly captured or copied by using a framework. The electronic device 100 may configure the captured or copied text or image as an object. The electronic device 100 may generate a new transmission message (for example, a text message or email) to which the captured or copied text or image is attached.

It may be understood that embodiments of the present disclosure can be implemented in software, hardware, or a combination thereof. Such software may be stored, for example, in a volatile or non-volatile storage device such as a ROM, etc., a memory such as a RAM, a memory chip, a memory device, or a memory IC, or an optical or magnetic recordable and a non-transitory machine (e.g. a computer)-readable medium such as a compact disc (CD), a digital versatile disc (DVD), a magnetic disk, or a magnetic tape, regardless of its ability to be erased or its ability to be re-recorded.

It will be appreciated that the method of executing an application and the electronic device therefor according to the present disclosure may be implemented by a computer or a portable terminal including a controller and a memory, and the memory may be an example of a non-transitory machine-readable storage medium that is suitable to store one or more programs including instructions for implementing the embodiments of the present disclosure. Accordingly, the present disclosure includes a program including a code for implementing the apparatus or method described in any of the appended claims of the specification and a non-transitory machine (computer or the like) readable storage medium for storing the program. Further, the program may be electronically carried by any medium such as a communication signal transferred through a wired or wireless connection, and the present disclosure appropriately includes equivalents thereof.

The method of executing an application and the electronic device therefor may receive the program from a program providing apparatus with wireless or wired connectivity and store the received program. Further, the user may selectively limit operations according to embodiments of the present disclosure within the user terminal or expand the operations to interworking with a server through a network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of executing an application by an electronic device, the method comprising:
    executing an application during a call;
    when the application is executed, displaying a call screen and a screen of the application;
    detecting a touch input for moving, to the call screen, an object to be transmitted within the screen of the application;
    when the touch input is detected, executing a transmission application based on information on the moved object and switching the call screen to a transmission application screen;
    generating a transmission message, to which the moved object is attached, through the transmission application based on information on a call counterpart;
    transmitting the transmission message to the call counterpart; and
    when a preset user input is received during the call, displaying an option window for configuring whether to support the touch input for moving to the call screen, the object to be transmitted within the screen of the application.

2. The method of claim 1, wherein the application is at least one of a picture application, a map application, an Internet application, a multimedia application, or a text application.

3. The method of claim 1, wherein the information on the call counterpart includes at least one of a phone number, a social network service (SNS) identifier (ID), a messenger ID, or an email address of the call counterpart.

4. The method of claim 1, wherein the object to be transmitted includes at least one of a picture, a text, a map, an icon, a sound source, a video, a multimedia file, or a drawing that are included within the screen of the application.

5. The method of claim 1, wherein the executing of the application comprises executing one of a message application, an email application, or a file sharing application according to capacity information of the moved object.

6. The method of claim 1, wherein the displaying of the call screen and the screen of the application comprises displaying the call screen or the screen of the application through a pop-up window.

7. The method of claim 1, wherein the detecting of the touch input comprises:
    detecting a drag input to the call screen from the screen of the application;
    when the drag input is detected, capturing the screen of the application; and
    configuring the captured screen of the application as the object to be attached to the transmission message.

8. The method of claim 1, wherein the detecting of the touch input comprises:
    configuring at least some of text displayed on the screen of the application as the object to be attached to the transmission message; and
    receiving a touch input for moving the configured object to the call screen.

9. The method of claim 1, wherein the detecting of the touch input comprises:
    selecting one or more objects displayed on the screen of the application; and
    detecting a touch input for moving the selected one or more objects to the call screen.

10. The method of claim 1, wherein the executing of the transmission application comprises switching the call screen or the screen of the application, to a transmission application screen.

11. The method of claim 1, wherein the receiving of the preset user input comprises receiving the preset user input on at least one of the call screen and the screen of the application during the call.

12. An electronic device comprising:
a display configured to display at least one of a call screen, a screen of an application, or a transmission application screen;
an input unit configured to detect a touch input;
at least one processor configured to:
  execute the application during a call,
  detect a touch input for moving an object to be transmitted, within the screen of the application, to the call screen,
  execute a transmission application based on information on the moved object when the touch input is detected, and
  generate a transmission message to which the moved object is attached, through the transmission application, based on information on a call counterpart; and
a communication unit configured to transmit the transmission message to the call counterpart,
wherein the at least one processor is further configured to, when the touch input is detected, switch the call screen to the transmission application screen, and
wherein the at least one processor is further configured to, when a preset user input is received during the call, control the display to display an option window for configuring whether to support the touch input for moving to the call screen, the object to be transmitted within the screen of the application.

13. The electronic device of claim 12, wherein the at least one processor is further configured to:
  execute a message application when capacity of the moved object is equal to or less than a preset value, and
  execute an email application when the capacity of the moved object is larger than the preset value.

14. The electronic device of claim 12, wherein the at least one processor is further configured to control the display to display the call screen or the screen of the application, through a pop-up window.

15. The electronic device of claim 12, wherein the at least one processor is further configured to, when a drag input to the call screen from the screen of the application is detected:
  capture the screen of the application, and
  configure the captured screen of the application as the object to be attached to the transmission message.

16. The electronic device of claim 12, wherein the at least one processor is further configured to:
  select as the object to be attached to the transmission message, text displayed on the screen of the application, and
  detect a touch input for moving the selected object to the call screen.

17. The electronic device of claim 12, wherein the at least one processor is further configured to:
  select as the object to be attached to the transmission message, one or more objects displayed on the screen of the application, and
  move the selected one or more objects to the call screen.

18. A non-transitory computer-readable recording medium having one or more programs recorded therein, the one or more programs including instructions for causing an electronic device to execute applications, the instructions comprising:
  first instructions for executing an application during a call;
  second instructions for, when the application is executed, displaying a call screen and a screen of the application;
  third instructions for detecting a touch input for moving an object to be transmitted within the screen of the application, to the call screen;
  fourth instructions for, when the touch input is detected, executing a transmission application based on information on the moved object and switching the call screen to a transmission application screen;
  fifth instructions for generating a transmission message, to which the moved object is attached, through the transmission application based on information on a call counterpart;
  sixth instructions for transmitting the transmission message to the call counterpart; and
  seventh instructions for, when a preset user input is receive during the call, displaying an option window for configuring whether to support the touch input for moving to the call screen, the object to be transmitted within the screen of the application.

* * * * *